United States Patent
Carter et al.

(10) Patent No.: US 9,753,718 B1
(45) Date of Patent: Sep. 5, 2017

(54) NON-DISRUPTIVE UPGRADE INCLUDING ROLLBACK CAPABILITIES FOR A DISTRIBUTED FILE SYSTEM OPERATING WITHIN A CLUSTER OF NODES

(71) Applicant: EMC Corporation, Hopkinton, MA (US)

(72) Inventors: Gerald Carter, Dadeville, AL (US); David Richards, Seattle, WA (US); Scott Haskin, Des Moines, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 14/982,012

(22) Filed: Dec. 29, 2015

(51) Int. Cl.
*G06F 9/44* (2006.01)
*G06F 12/00* (2006.01)
*G06F 9/445* (2006.01)
*G06F 17/30* (2006.01)

(52) U.S. Cl.
CPC .............. *G06F 8/65* (2013.01); *G06F 9/4406* (2013.01); *G06F 17/30203* (2013.01); *G06F 17/30067* (2013.01)

(58) Field of Classification Search
CPC .... G06F 8/65; G06F 9/4406; G06F 17/30067; G06F 17/30203
USPC .......................... 717/168–173; 707/822, 827
See application file for complete search history.

(56) References Cited

U.S. PATENT DOCUMENTS

| | | | |
|---|---|---|---|
| 8,627,305 B1 * | 1/2014 | Dalcher | G06F 9/44521 717/124 |
| 2003/0233648 A1 * | 12/2003 | Earl | G06F 8/65 717/176 |
| 2005/0267951 A1 * | 12/2005 | Joshi | G06F 8/65 709/220 |

(Continued)

*Primary Examiner* — Qing Chen
(74) *Attorney, Agent, or Firm* — Krishnendu Gupta

(57) ABSTRACT

Implementations are provided herein for non-disruptive upgrade including rollback capabilities for a distributed file system within a cluster of nodes. To continue availability of the file system to external clients during the upgrade process, nodes can be upgraded piecemeal, for example, in one implementation, one node at a time. When a node is undergoing certain stages of the upgrade process, external clients can be directed toward the remaining nodes of the file system that are not currently being upgraded, including already upgraded nodes, to perform client activity. During the upgrade process, a first subset of nodes can be running in an upgraded state while a second subset of nodes can be in a non-upgraded state, both providing access to external clients in a seamless manner. During the upgrade process, an administrator can decide to rollback any upgrades and return the distributed file system to its previous version (e.g., the version of the file system prior to starting the non-disruptive upgrade process). Hooks can be provided prior to, during, and after various stages of the upgrade or rollback process that can allow services of the distributed file system to be notified of certain events of the upgrade process, or execute service specific processes at distinct times during the upgrade process. At the conclusion of an upgrade or rollback process, the distributed file system can enter a committed state that finalizes the process and cements an upgrade or a rollback to a more permanent state.

18 Claims, 12 Drawing Sheets

(56) References Cited

U.S. PATENT DOCUMENTS

| | | | | |
|---|---|---|---|---|
| 2008/0263535 | A1* | 10/2008 | Dias | G06F 8/67 717/168 |
| 2009/0249368 | A1* | 10/2009 | Needamangala | G06F 8/67 719/328 |
| 2012/0110150 | A1* | 5/2012 | Kosuru | H04L 41/082 709/221 |

* cited by examiner

NON-DISRUPTIVE UPGRADE INCLUDING ROLLBACK CAPABILITIES FOR A DISTRIBUTED FILE SYSTEM OPERATING WITHIN A CLUSTER OF NODES

CROSS REFERENCE TO RELATED APPLICATIONS

This application is related to co-pending U.S. patent application Ser. No. 14/982,020 for NON-DISRUPTIVE UPGRADE MIGRATION HEURISTICS AND HEALTH CHECK and filed concurrently herewith, which is incorporated herein by reference for all purposes; to co-pending U.S. patent application Ser. No. 14/982,063 for NON-DISRUPTIVE UPGRADE CONFIGURATION TRANSLATOR and filed concurrently herewith, which is incorporated herein by reference for all purposes.

FIELD OF THE INVENTION

This invention relates generally to distributed file systems, and more particularly to implementations for the non-disruptive upgrade and rollback capability for nodes among a cluster of nodes operating as a distributed file system.

BACKGROUND OF THE INVENTION

Distributed file systems offer many compelling advantages in establishing high performance computing environments. One example is the ability to easily expand, even at large scale. Another example is the ability to support multiple unique network protocols. In one example, a distributed file system can operate under a cluster of nodes topology, whereby clients can connect to any node among the cluster of nodes to perform file system activity. Individual nodes among the cluster of nodes each can contain their own processor(s), storage drives, memory and the like. Operating together in a cluster, the nodes can respond to client requests, store data, mirror data, and accomplish all the tasks of a modern file system. A cluster of nodes, in some cases, can provide easy scalability by providing for new nodes to be added to the cluster of nodes to increase the amount of storage space within the distributed file system and/or to meet other needs of the users of the distributed file system.

One demand that users of a distributed file system likely have is to avoid any single point of failure to user critical work flows. For example, if a storage device within one of the nodes fails, users expect the data to be useable from a secondary source, with as little disruption as possible. This is one reason why data is mirrored across more than one storage device and more than one node. If a drive or a node fails, a client can still find the data they seek within a different drive and/or connect to a different node. With businesses depending on the reliability of their data storage systems in order to serve their customers, many businesses expect a distributed file system to continue to operate every hour of every day throughout the year. However, when an administrator of a distributed file system operating within a cluster of nodes wishes to upgrade the file system to a new version, the process can cause disruptions to users of the file system. For example, if every node of the file system needed to be upgraded simultaneously, clients would be unable to connect to a node and access data stored within the file system during the upgrade process. However, if nodes are upgraded one-by-one, nodes running two different versions of the operating software may be incompatible. In addition, once a node or the cluster of nodes has been upgraded, an administrator may wish to downgrade back to previous version for any number of reasons. Therefore, there exists a need to provide for non-disruptive upgrade and rollback capabilities for a cluster of nodes operating as a distributed file system, that maintain continuous availability to clients of the file system, while minimizing disruptions to their workflows.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a supervisor can be initiated on at least one node among a cluster of nodes, wherein the cluster of nodes operates to provide a distributed file system. An agent can be initiated on each node in the cluster of nodes, wherein the agent is responsive to commands issued by the supervisor. A set of hook executables associated with a pre upgrade hook can be executed, wherein the pre upgrade hook is a cluster class hook. The agent for each node in the cluster of nodes can be iteratively instructed to complete a sequential upgrade process, where the sequential upgrade process can include: marking a tracking state associated with the node can as "upgrading;" new operating system software can be installed on the node; the set of hook executable associated with a pending reboot hook can be executed, wherein the pending reboot hook is a node class hook; the set of hook executables associated with a data migration upgrade hook can be executed, wherein the data migration upgrade hook is a node class hook; the node can be rebooted; the set of hook executables associated with an upgrade post reboot initial hook can be executed, wherein the upgrade post reboot initial hook is a node class hook; the set of hook executables associated with an upgrade post reboot final hook can be executed, wherein the upgrade post reboot final hook is a node class hook; and the tracking state associated with the node can be marked as upgraded. In response to each node in the cluster of nodes being marked with the tracking state of upgraded, the set of hook executables associated with a last node post upgrade hook can be executed, wherein the last node post upgrade hook is a cluster class hook.

In another aspect, in response to each node in the cluster of nodes being marked with the tracking state of upgraded and receiving a commit request: the tracking state associated with each node in the cluster of nodes can be marked as commit; a set of hook executables associated with a post commit hook can be executed, wherein the post commit hook is a cluster class hook; and the tracking state associated with each node in the cluster of nodes can be marked as done.

The following description and the drawings set forth certain illustrative aspects of the specification. These aspects are indicative, however, of but a few of the various ways in which the principles of the specification may be employed. Other advantages and novel features of the specification will

DETAILED DESCRIPTION

Figure 1:
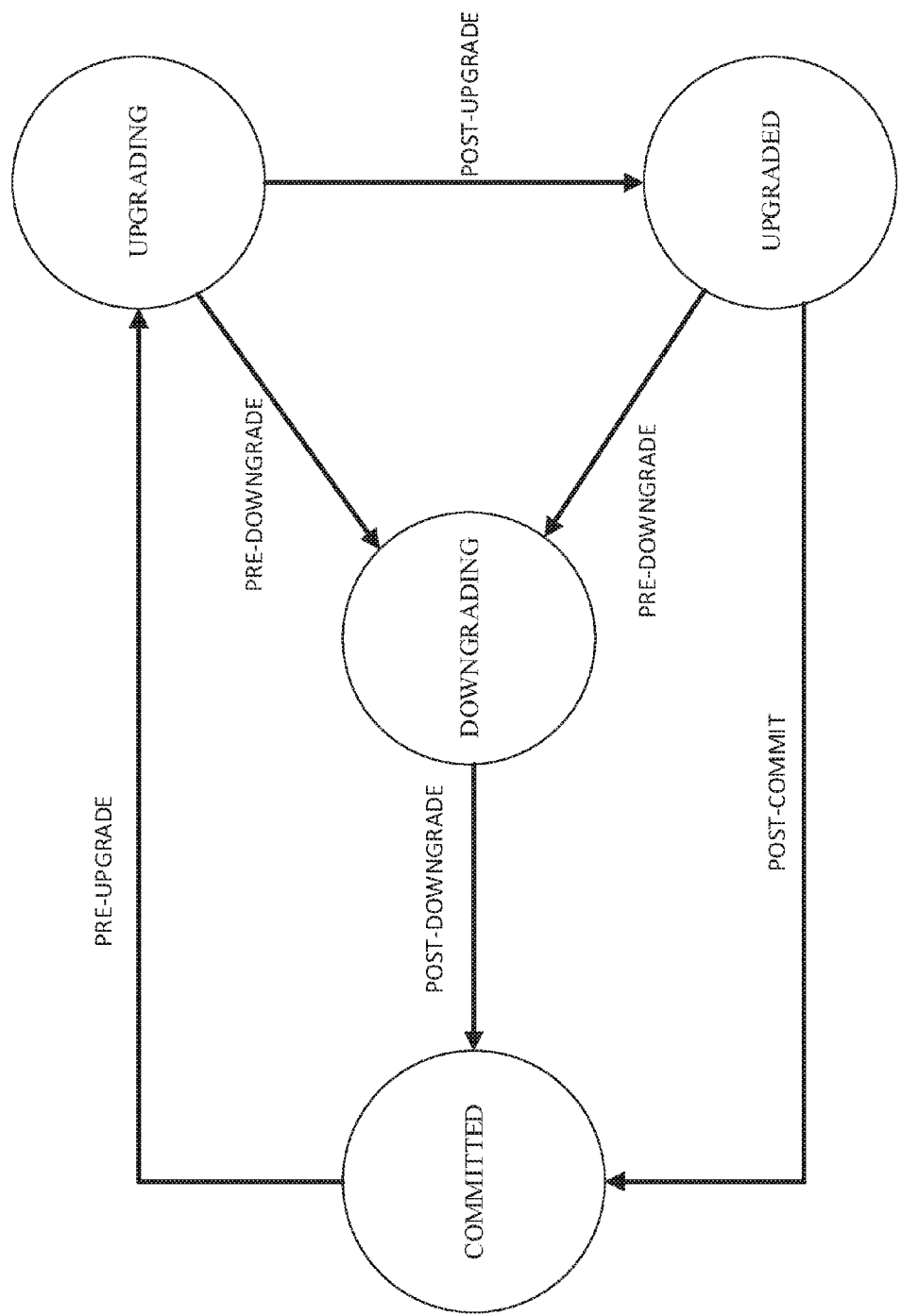
FIG. 1 illustrates an example state diagram for a non-disruptive upgrade process with rollback functionality in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "protocol head" refers to a gateway local to an individual node that manages communications with external clients and sometime internal clients using a specific network protocol. For example, a Network File System ("NFS") external client that makes a file system request to the distributed file system would communicate with the NFS protocol head in making the request. The protocol head can schedule work items, translate file system requests from the native protocol language to operating system commands of the native file system in order to process the request, and communicate with the external clients using protocol specific cadence that the protocol client expects. Examples of the types of protocol heads that can exist within a distributed file system include NFS, Server Message Block ("SMB"), Hadoop Distributed File System ("HDFS"), hypertext transfer protocol ("HTTP"), file transfer protocol ("FTP"), simple object access protocol ("SOAP"), and protocols specific to the Open Stack project such as Open Stack Swift, Open Stack Manila, etc. In addition to network protocols, the job engine as defined below can act similar to a protocol head in scheduling and performing internal file system jobs.

The term "job engine" refers to a component within the distributed file system that manages automated processes such as file system maintenance, file system data services, and non-client initiated work items. The job engine can queue work items similar to how a protocol head queues work items received by protocol clients.

The term "supervisor" refers to a short lived process that is run to assess the current state of the cluster and take appropriate action. The supervisor is stateless and can collect the state from any agent by passing messages to and from the agent running on the same node as the supervisor or a different node than the supervisor. The supervisor can then decide what actions, if any, to take, at any given point during the upgrade, rollback, or commit process.

The term "agent" refers to a node centric application that runs on each node in the cluster of nodes. It can be used to take actions on the local node based on received messages. For example, it can take actions based on instructions received from a supervisor. An agent can maintain a local persistent storage area (e.g., in stable storage, flash storage, cache memory, etc.) to indicate what has been accomplished on that particular node.

The term "hook" refers to a predetermined set of applications and/or files to run at specific points during the non-disruptive upgrade, downgrade, or commit process. At different times throughout the upgrade process, there may be point of interest for varying applications. A hook allows for applications to be injected into the upgrade to support application specific needs. In one implementation, scripts, tasks, processes, etc. can be added as executables that are ran when the hook is processed. In one implementation, hooks can trigger notifications that the upgrade process has reached the stage associated with the hook to other processes that subscribed to such events. In one implementation, a hook can be a command run when an event occurs wherein the event can be associated with transitions in the upgrade and rollback process. In one implementation, a hook can have a predefined directory assigned to it, where when run, the hook will execute each file in the directory marked as an executable. Executables within the hook directory can be executed at the same time in parallel. In one implementation, the executable are ran in an undefined order. The hook can wait until it confirms each executable in the hook has completely successfully before completing itself. In one implementation, if an executable does not complete in a timely fashion (where timeliness can be configured by an administrator, have set default values, or can be tailored to the type of applications) an alarm can be raised to either the agent and/or the supervisor. Hooks can occur in at least two classes. A cluster class hook will attempt to execute the set of executables on all nodes of the cluster of nodes simultaneously in parallel. Cluster class hooks can support executables in the hook running later (e.g., not in parallel) on a "missed" node for error correction purposes. A node class hook is executed on one node at a time, with other actions, including, potentially, other hooks or other unrelated processes.

The term tracking state refers to the current state of the node as it how it relates to the non-disruptive upgrade process. The upgrade, downgrade, and commit processes as described in implementations of this disclosure can mark the node with a tracking state that can describe to other processes the current state of the node. Tracking states can include: "upgrade ready" which marks the node as ready to be upgraded; "upgrading" which marks the node as upgrading; "upgraded" which marks the node as having completed upgrading; "commit" which marks the nod as committed; "done" which marks the node as having finished all the steps of the upgrade (or in some implementations, downgrade) process; rollback which marks the node to be rolledback; and rolledback which marks the node as having been rolled back. The tracking state of a node can be accessed by the supervisor to gauge progress of the upgrade process or by other services not associated with the upgrade process.

Implementations are provided herein for non-disruptive upgrade including rollback capabilities for a distributed file system within a cluster of nodes. To continue availability of the file system to external clients during the upgrade process, nodes can be upgraded piecemeal, for example, in one implementation, one node at a time. When a node is undergoing certain stages of the upgrade process, external clients can be directed toward the remaining nodes of the file system that are not currently being upgraded, including already upgraded nodes, to perform client activity. During the upgrade process, a first subset of nodes can be running in an upgraded state while a second subset of nodes can be in a non-upgraded state, both providing access to external clients in a seamless manner. During the upgrade process, an administrator can decide to rollback any upgrades and return the distributed file system to its previous version (e.g., the version of the file system prior to starting the non-disruptive upgrade process). Hooks can be provided prior to, during, and after various stages of the upgrade or rollback process that can allow services of the distributed file system to be notified of certain events of the upgrade process, or execute service specific processes at distinct times during the upgrade process. At the conclusion of an upgrade or rollback process, the distributed file system can enter a committed state that finalizes the process and cements an upgrade or a rollback to a more permanent state.

Referring now to FIG. 1, there is illustrated an example state diagram for a non-disruptive upgrade process with rollback functionality in accordance with implementations of this disclosure. The state diagram being in the committed state, where you operating a stable version of the distributed file system that can no longer be downgraded to a previous state. When in a committed state, all the services associated with the version of the committed state of distributed file system can be active. For example, disk structures can reflect the current version of the distributed file system. Configuration information can reflect the current version of the operating system. The arrows denote the potential flows of the states during an upgrade or downgrade process. The pre-upgrade, pre-downgrade, post-upgrade, post downgrade, and post-commit labels denote cluster class hooks that are a part of the upgrade process. It can be appreciated that once in a committed state, downgrades are no longer available.

Prior to upgrading to a new version of the operating system of the distributed file system, a pre-upgrade process can occur. The pre upgrade process can occur through a set of pre upgrade hooks that are a cluster class hook. The hook can run a set of custom executables associated with the stage of the upgrade. For example, for pre-upgrade, executables in the hook can include an application that determines if the minimum amount of disk space is available across the cluster of nodes to support the upgrade process. In another example, the protection level of the cluster can be analyzed to determine whether an upgrade would risk data loss. In another example, all the drives in all the nodes can run a health check to determine the health of the drive. It can be appreciated that any number of diagnostics can be run that can assess the ability of the cluster to upgrade and/or prepare the cluster for an impending upgrade. It can be appreciated that some of these node level health checks, including disk health can be performed again at the node level in a hook associated with the node upgrade process as more fully described below.

During the upgrading state, nodes can proceed with the upgrading process, specifically as described below in FIG. 7 and contextually described in FIGS. 2-5 below. The upgrading process can occur one node at a time or in some implementations several nodes at a time in parallel. It can be appreciated that during at least some parts of the process when a node is an upgrading state, the node is inaccessible to clients. The more nodes at any one time that are inaccessible, the more likely there will be disruption for clients attempting to access the distributed file system. Administrators or automated tools can gauge the impact of the upgrade and configure the amount of nodes at any one time allowed to be in an upgrading state. For example, minimizing the impact of the upgrade process to active clients could mean upgrading a single node at any one time whereby when the node reaches an upgraded state the next node can enter the upgrading state. However, for clusters of nodes with hundreds of nodes, it may make sense to have more than one node at a time in an "upgrading" state as the large amounts of unaffected nodes would still be available to respond to client requests. In another example, a cluster of nodes could have as little as 2 or 3 nodes, whereby having more than one node in an upgrading state, and not responding to client requests, could cripple the ability to provide non-disruptive upgrades. In one implementation, an algorithm can be used to determine the total amount of nodes in the cluster during the pre-upgrade process and the algorithm can provide the maximum amount of nodes that can be in an upgrading state to both provide a faster upgrade process while still minimizing disruptions to current clients of the distributed file system.

Figure 2:
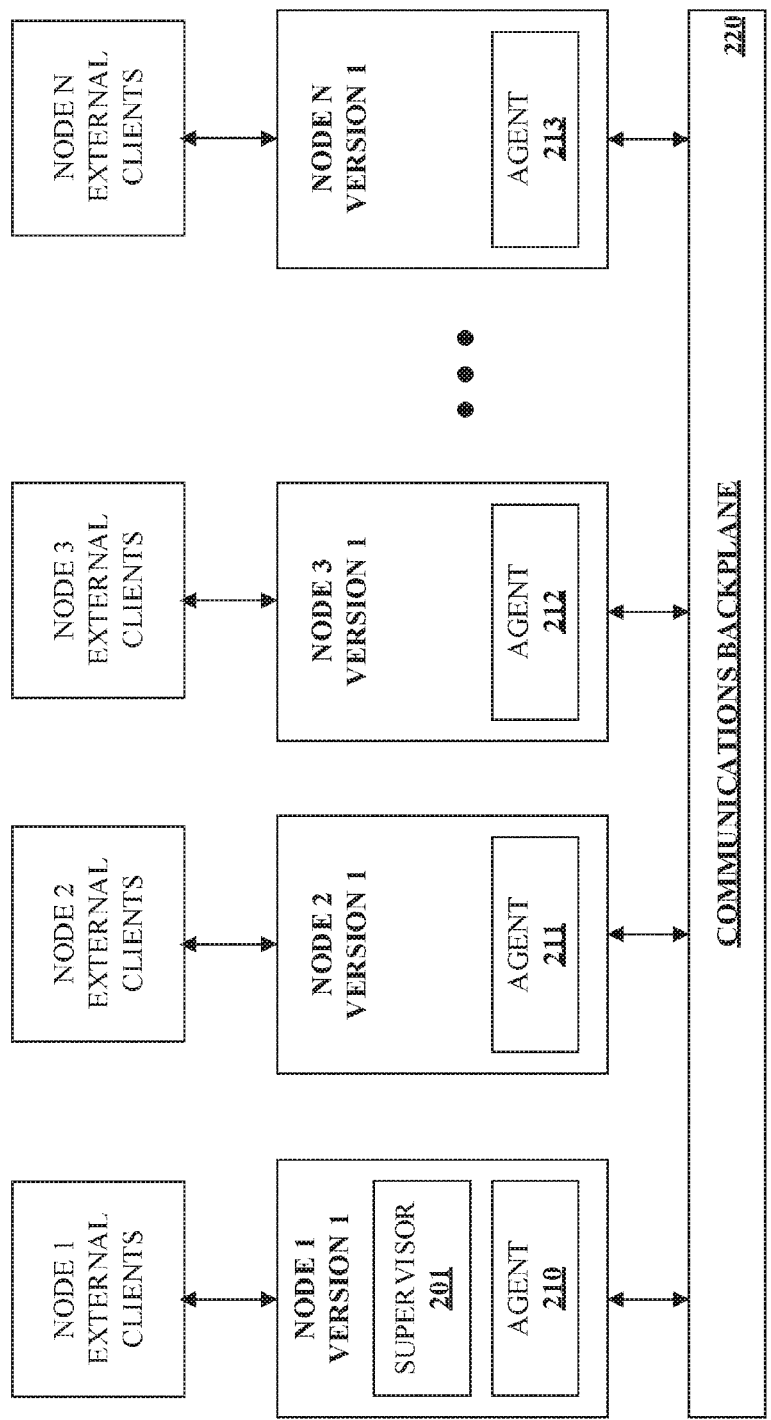
FIG. 2 illustrates an example cluster of nodes that have initiated a supervisor and agents to facilitate the non-disruptive upgrade process in accordance with implementations of this disclosure.

Referring now to FIG. 2, there is illustrated an example cluster of nodes that have initiated a supervisor and agents to facilitate the non-disruptive upgrade process in accordance with implementations of this disclosure. FIG. 2 denotes Node 1, Node 2, Node 3 and Node N (Where "N" is an integer greater than 3). Together, the nodes depicted form a cluster of nodes that operate together to form a distributed file system. In one implementation, the distributed file system is operable due to each node running a common operating system that facilitates communications between nodes for data processing, data mirroring, data protection, and all relevant data services in a modern file system. In one implementation, the operating system is the OneFS operating system that is developed and sold by EMC Corporation.

Figure 3:
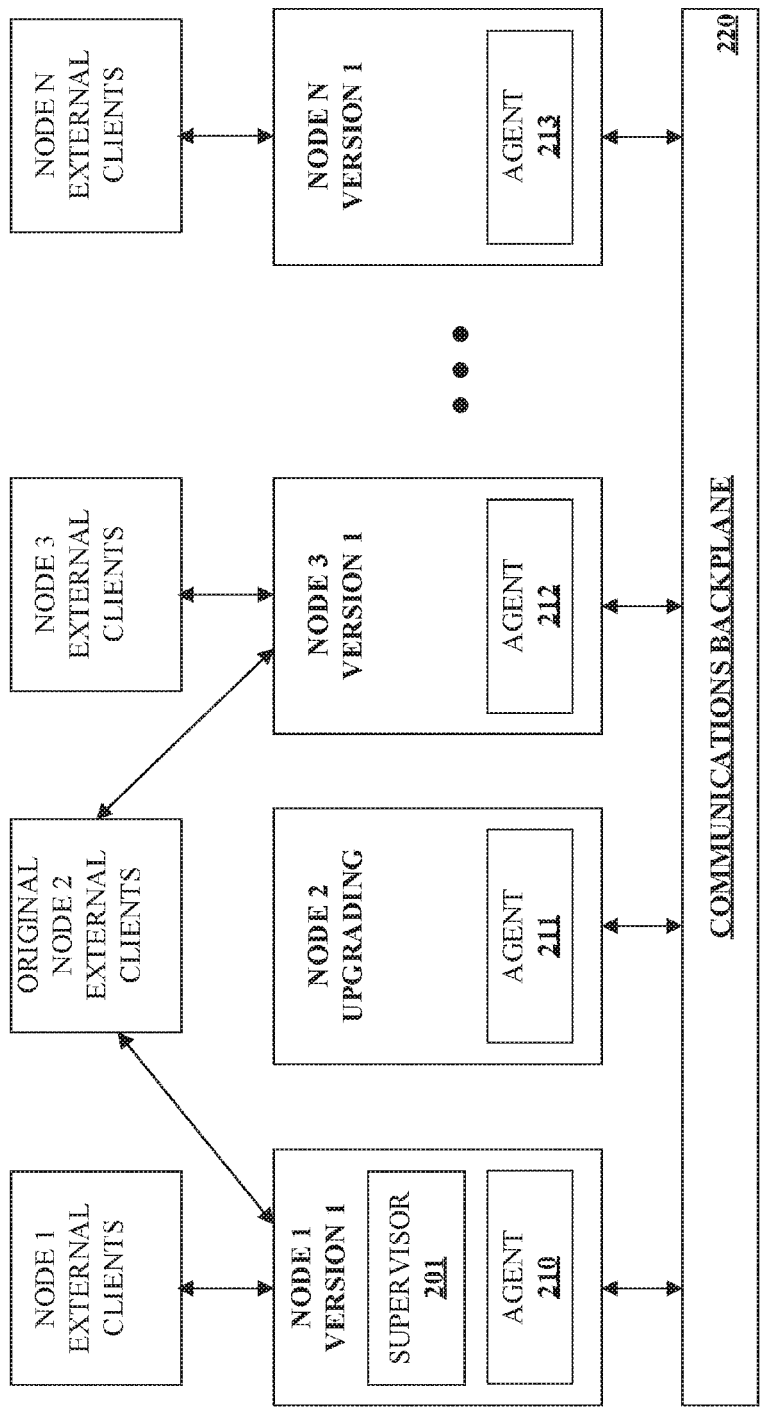
FIG. 3 illustrates an example cluster of nodes with an upgrading node in accordance with implementations of this disclosure.
Figure 4:
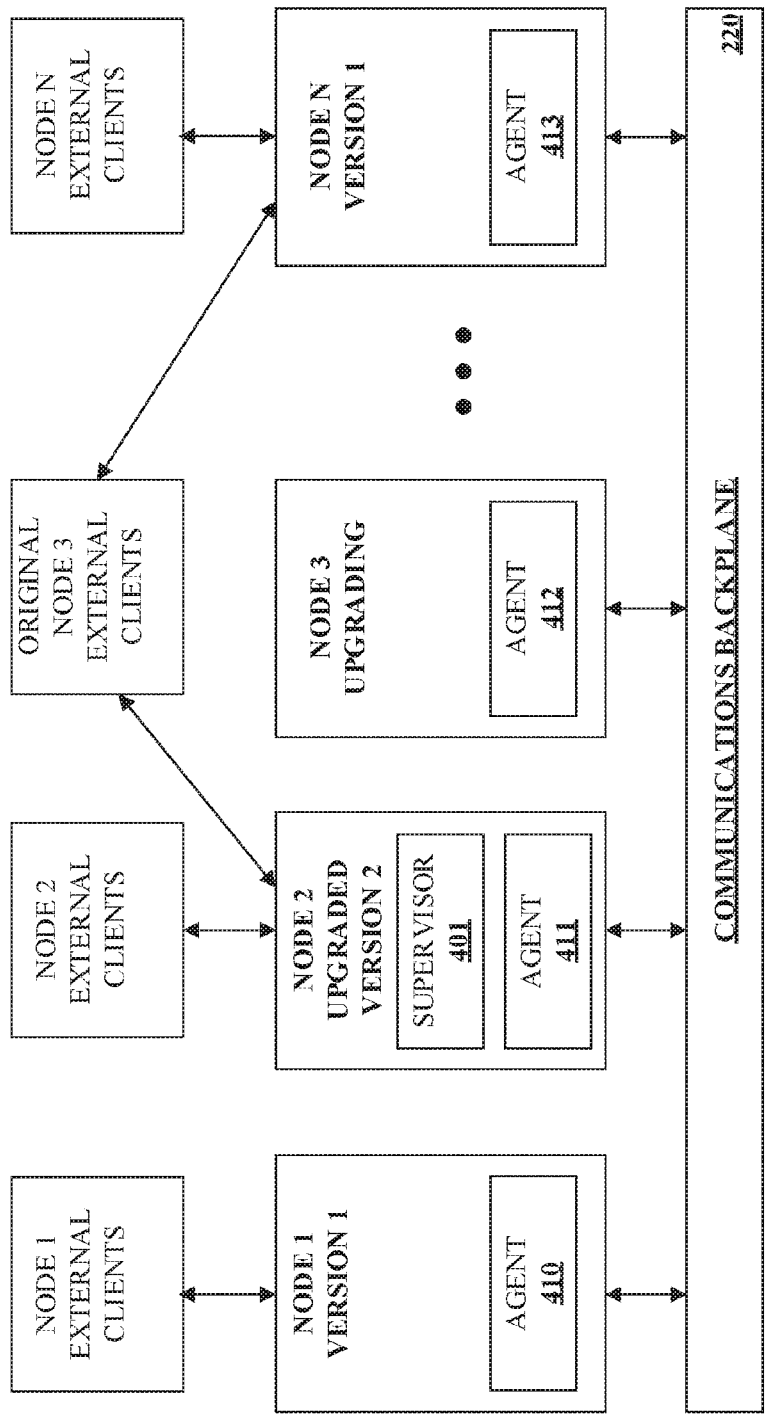
FIG. 4 illustrates an example cluster of nodes with an upgraded node and a an upgrading node in accordance with implementations of this disclosure.
Figure 5:
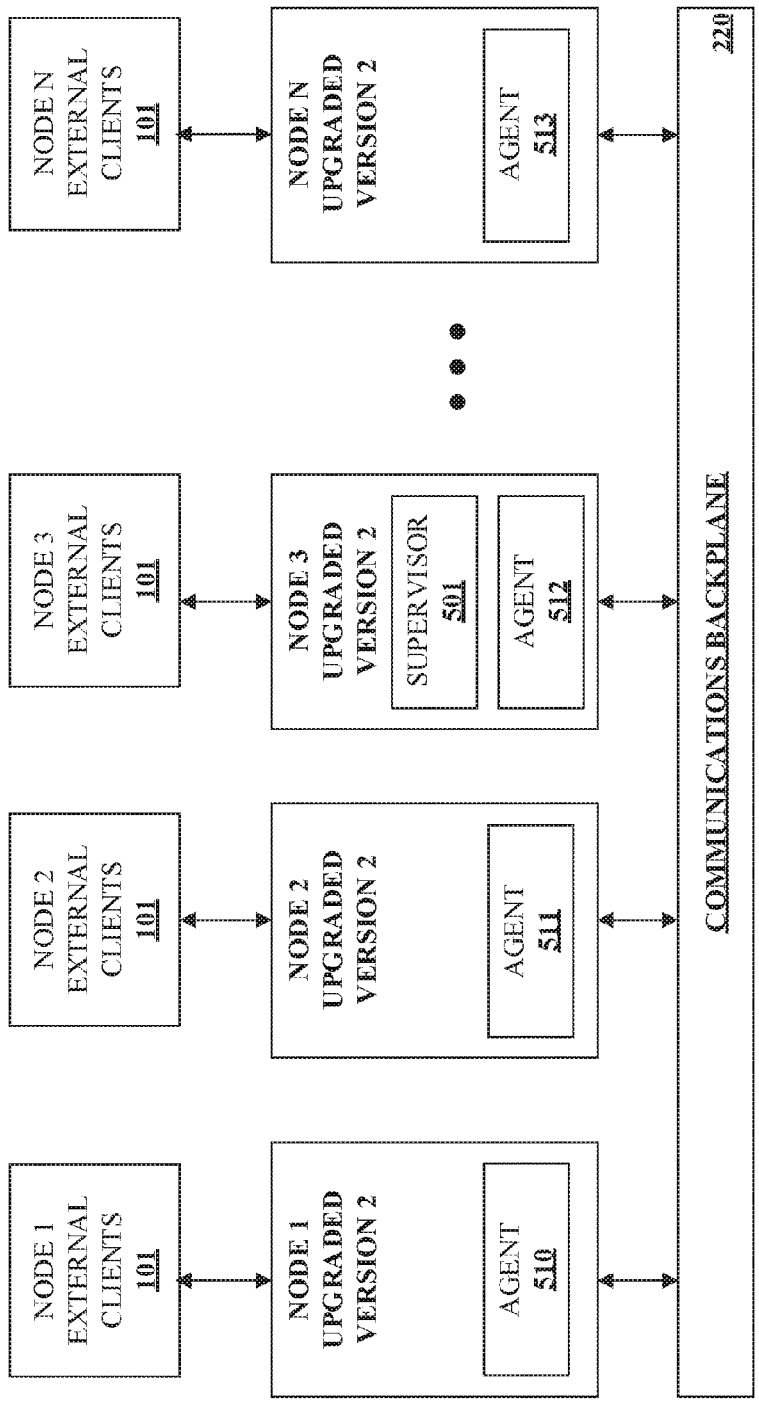
FIG. 5 illustrates an example cluster of nodes with each node upgraded in accordance with implementations of this disclosure.

It can be appreciated that the supervisor can be spun up and down on various nodes throughout the upgrade process. For example, in FIG. 2, the supervisor 201 is established on Node 1; however, as the upgrade process continues (as shown in FIGS. 3-5), the supervisor 201 can move to other nodes within the cluster of nodes. For example, while a node is upgrading, in general the supervisor should not be active on the upgrading node.

Nodes can be interconnected by a communications backplane 220 that is more fully described below with respect to FIG. 11. The communications backplane 220 can be a high bandwidth low-latency backplane that provides for inter-node communications. For example, the supervisor 201 can communicate with Agents 211, 212, and 213 using the communications backplane 220.

As depicted in FIG. 2, all the nodes are running in a committed state in Version 1 of the operating system for the distributed file system. It can be appreciated that "Version 1" is used for ease of explanation and in no way is limiting. The supervisor and agents have been initialized on the respective nodes to begin the pre-upgrade process (e.g., running the cluster class pre-upgrade hooks as described above). During this part of the process, Nodes 1, 2, 3 and 4 are still capable of servicing their respective external clients.

Referring now to FIG. 3, there is illustrated an example cluster of nodes with an upgrading node in accordance with implementations of this disclosure. Node 2 has started the upgrading process as more fully described with respect to FIG. 7 below. During the upgrading process, node class hooks can be used to support applications that can facilitate migrating the original node 2 external clients to other nodes within the cluster of nodes that can continue to service their file system requests. For example, the pending reboot hook can contain executables that migrate clients off the node where the hook is ran. In the depicted example, original node 2 external clients are migrated to both Node 1 and Node 3; however, they could also be migrated to Node 4 or other non-depicted nodes within the cluster of nodes.

Referring now to FIG. 4, there is illustrated an example cluster of nodes with an upgraded node and an upgrading node in accordance with implementations of this disclosure. Node 2 has completed its upgrading process and has been marked as upgraded. A node marked as upgraded can once again serve external clients. A configuration translator that provides for operating a single distributed file system with nodes running differing versions is further disclosed in the co-pending applications incorporated by reference above. As depicted, an upgraded Node 2 can serve clients along with a non-upgraded Node 1 and Node N while Node 3 executes the upgrading process. Supervisor 401 is now on the newly upgraded Node 2, while all nodes continue to retain an agent (e.g., agents 410, 411, 412 and 412).

Referring now to FIG. 5, there is illustrated an example cluster of nodes with each node upgraded in accordance with implementations of this disclosure. With each node in an upgraded state, an administrator would have the option of committing the upgrade in process described below in relation to FIG. 10.

It can be appreciated that crossing from an upgraded state to a committed state that once crossed, prevents a user from rolling back to a previous state. The cluster can start updating on disk structures to reflect the new version, rewrite configuration information, authorizes services and features that have dependencies on the newer versioned software.

In one implementation, an external client can query a node or the cluster about what version of the operating system the cluster or a node is running. Prior to entering the committed state, the response to such a query will always be the lowest common denominator for all nodes for compatibility purposes. Once a committed state is reached, the version returned in such a query would be the upgraded version.

In one implementation, distributed file system services can use the upgrade framework as a mechanism for opting-in for providing their services. For example, a new version of a protocol service, may desire to wait until the cluster of nodes is in a committed state before allowing clients access to the new features. In another example, an enhancement to snapshots within the distributed file system can be programmed to be active upon all nodes reaching an upgraded state. It can be appreciated that by marking the nodes with a state, distributed file system services can tap into those states and use them to make available or limit access to features.

In one implementation, the job engine can associate the version of the cluster with a job when it is started. It can be appreciated that by marking jobs with the version of the cluster when started, the file system can determine jobs that are running parallel on old and new versions. It can be appreciated that the job engine can limit the availability of some jobs to certain versions of the file system. As stated above, in one implementation, the version of the file system, in general, is the lowest common denominator of all the nodes, and doesn't report as the upgraded version until in a committed state.

FIGS. 6-10 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 6:
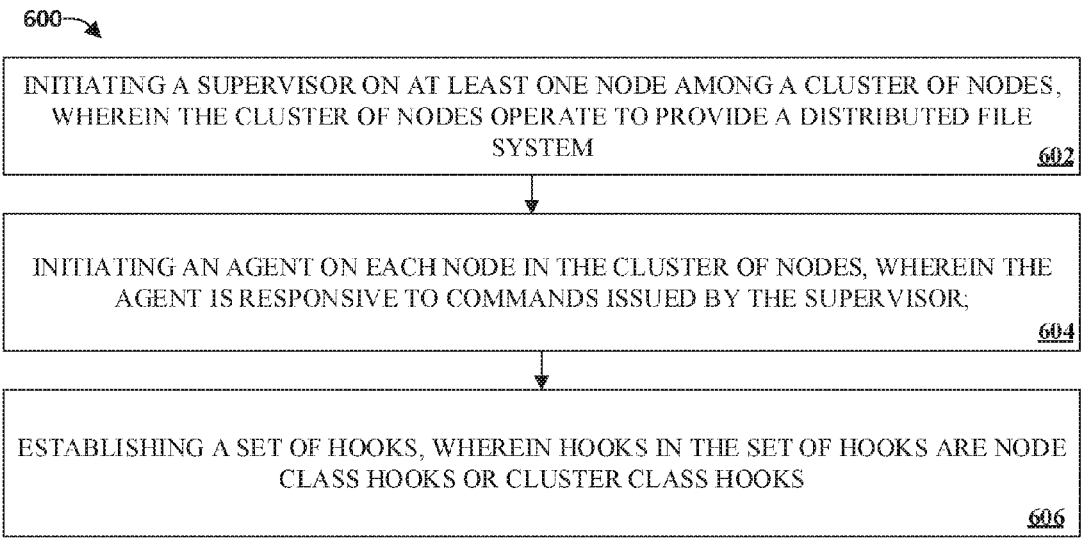
FIG. 6 illustrates an example method for initiating a supervisor, an agent, and a set of hooks for non-disruptive upgrades in accordance with implementations of this disclosure.

FIG. 6 illustrates an example method for initiating a supervisor, an agent, and a set of hooks for non-disruptive upgrades in accordance with implementations of this disclosure.

At 602, a supervisor can be initiated on at least one node among a cluster of nodes, wherein the cluster of nodes operate to provide a distributed file system.

At 604, an agent can be initiated on each node in the cluster of nodes, wherein the agent is responsive to commands issued by the supervisor.

At 606, a set of hooks can be established, wherein hooks in the set of hooks are node class hooks or cluster class hooks. In one implementation, hooks in the set of hooks are associated with unique predefined directories containing a set of hook executables associated with the hook. In one implementation, hooks can be associated with entries in a database that contain the location of the hook executables or the individual executables.

Figure 7:
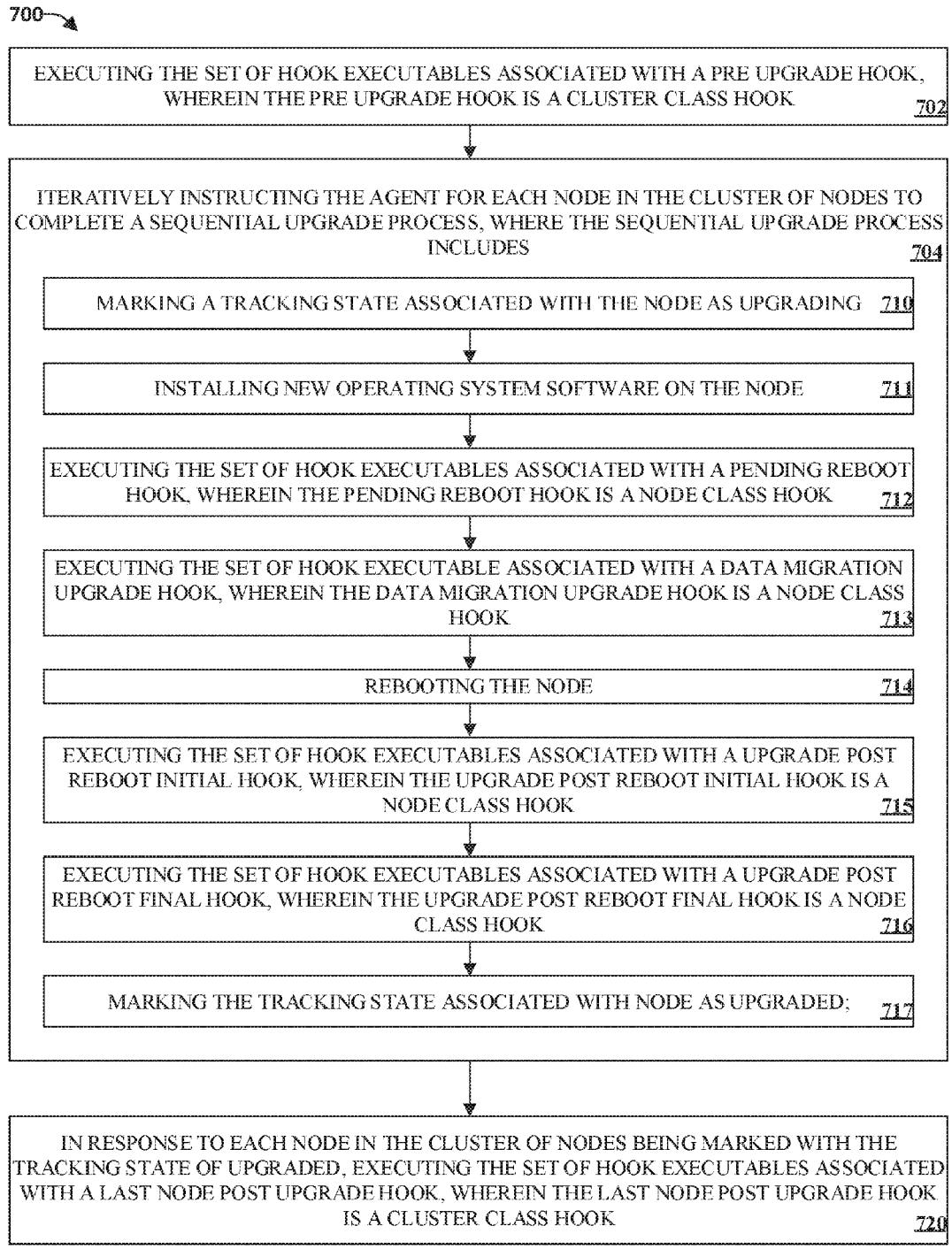
FIG. 7 illustrates an example method for iteratively updating nodes within a cluster of nodes to an upgraded state in accordance with implementations of this disclosure.

FIG. 7 illustrates an example method for iteratively updating nodes within a cluster of nodes to an upgraded state in accordance with implementations of this disclosure.

At 702, the set of hook executable associated with a pre upgrade hook can be executed, wherein the pre upgrade hook is a cluster class hook.

At 704, the agent for each node in the cluster of nodes can be iteratively instructed to complete a sequential upgrade process, where the sequential upgrade process includes steps 710-717 as provided below. In one implementation, the iteration can proceed one node at a time so that only one node at any given point is going through the upgrade process. In one implementation, more than one node can proceed at a time, including a subset of the entire cluster of nodes, or every node of the cluster of nodes in a simultaneous upgrade.

At 710, a tracking state associated with the node can be marked as "upgrading."

At 711, new operating system software can be installed on the node.

At 712, the set of hook executable associated with a pending reboot hook can be executed, wherein the pending reboot hook is a node class hook.

At 713, the set of hook executables associated with a data migration upgrade hook can be executed, wherein the data migration upgrade hook is a node class hook.

At 714, the node can be rebooted.

At 715, the set of hook executables associated with an upgrade post reboot initial hook can be executed, wherein the upgrade post reboot initial hook is a node class hook.

At 716, the set of hook executables associated with an upgrade post reboot final hook can be executed, wherein the upgrade post reboot final hook is a node class hook.

At 717, the tracking state associated with the node can be marked as upgraded.

At 720, in response to each node in the cluster of nodes being marked with the tracking state of upgraded, the set of hook executables associated with a last node post upgrade hook can be executed, wherein the last node post upgrade hook is a cluster class hook.

Figure 8:
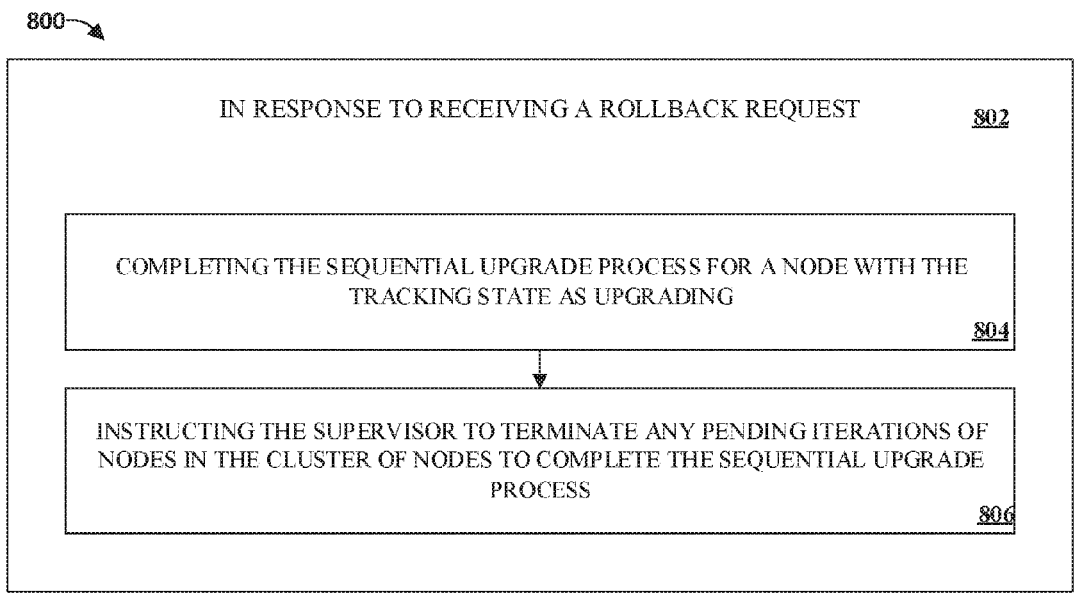
FIG. 8 illustrates an example method for responding to a rollback request in accordance with implementations of this disclosure.

FIG. 8 illustrates an example method for responding to a rollback request in accordance with implementations of this disclosure. At 802, in response to receiving a rollback request, steps 804-806 can proceed as provided below. At 804, the sequential upgrade process for a node (as described above in steps 710-17) can be completed. For example, the current node that is undergoing the sequential upgrade process can finish that process. At 806, the supervisor can be instructed to terminate any pending iterations of nodes in the cluster of nodes to complete the sequential upgrade process. This step can prevent any new node from starting the sequential upgrade process. Any nodes that have been upgraded can then be rolledback as more fully described with respect to FIG. 9 below.

Figure 9:
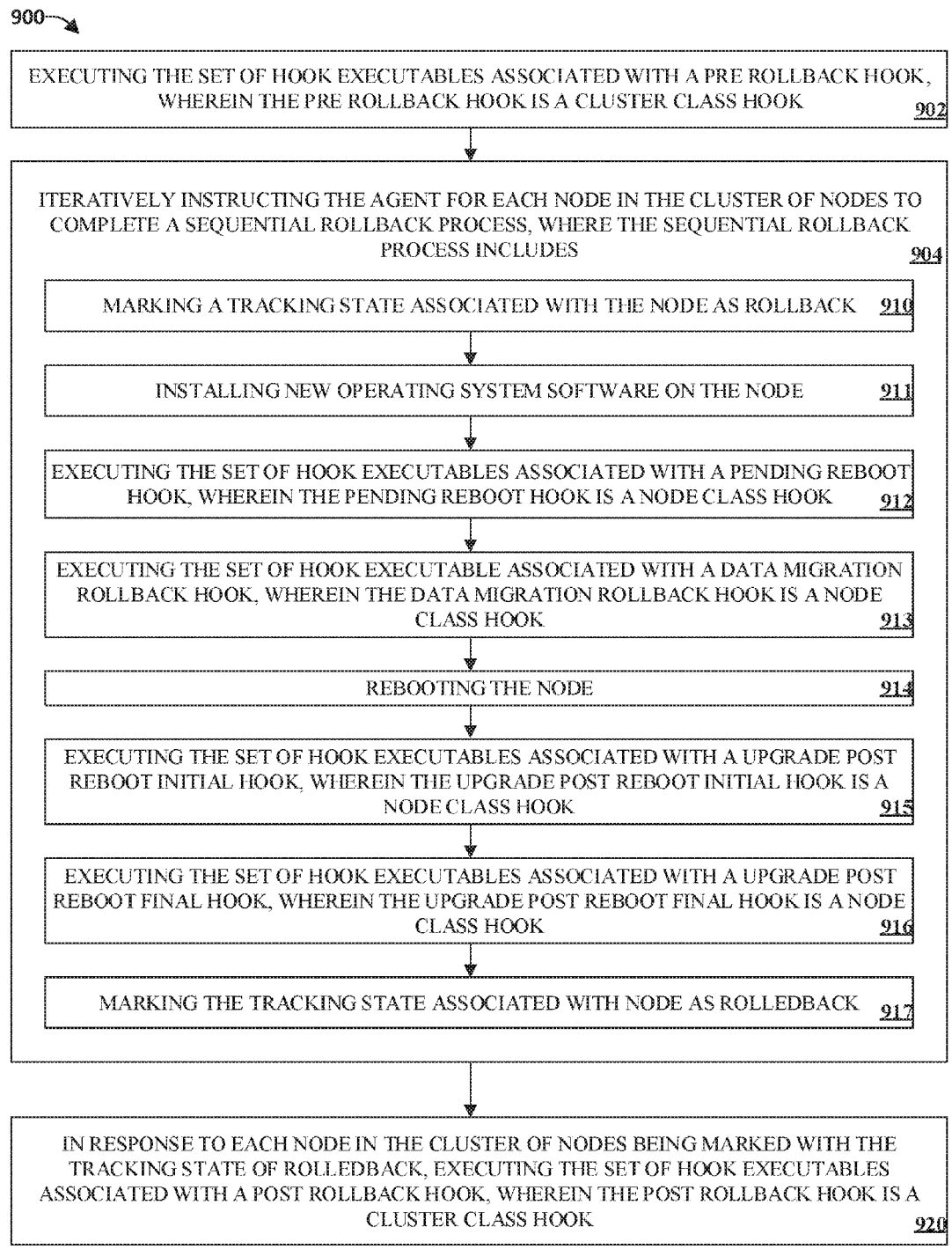
FIG. 9 illustrates an example method for iteratively rolling back nodes within a cluster of nodes to a rolledback state in accordance with implementations of this disclosure.

FIG. 9 illustrates an example method for iteratively rolling back nodes within a cluster of nodes to a rolledback state in accordance with implementations of this disclosure.

At 902, the set of hook executable associated with a pre rollback hook can be executed, wherein the pre rollback hook is a cluster class hook.

At 904, the agent for each node in the cluster of nodes can be iteratively instructed to complete a sequential rollback process, where the sequential upgrade process includes steps 910-917 as provided below. In one implementation, the iteration can proceed one node at a time so that only one node at any given point is going through the upgrade process. In one implementation, more than one node can proceed at a time, including a subset of the entire cluster of nodes, or every node of the cluster of nodes in a simultaneous upgrade.

At 910, a tracking state associated with the node can be marked as "rollback."

At 911, new operating system software can be installed on the node.

At 912, the set of hook executable associated with a pending reboot hook can be executed, wherein the pending reboot hook is a node class hook.

At 913, the set of hook executables associated with a data migration upgrade hook can be executed, wherein the data migration upgrade hook is a node class hook.

At 914, the node can be rebooted.

At 915, the set of hook executables associated with an upgrade post reboot initial hook can be executed, wherein the upgrade post reboot initial hook is a node class hook.

At 916, the set of hook executables associated with an upgrade post reboot final hook can be executed, wherein the upgrade post reboot final hook is a node class hook.

At 917, the tracking state associated with the node can be marked as rolledback.

At 920, in response to each node in the cluster of nodes being marked with the tracking state of rolledback, the set of hook executables associated with a post rollback hook can be executed, wherein the post rollback hook is a cluster class hook.

Figure 10:
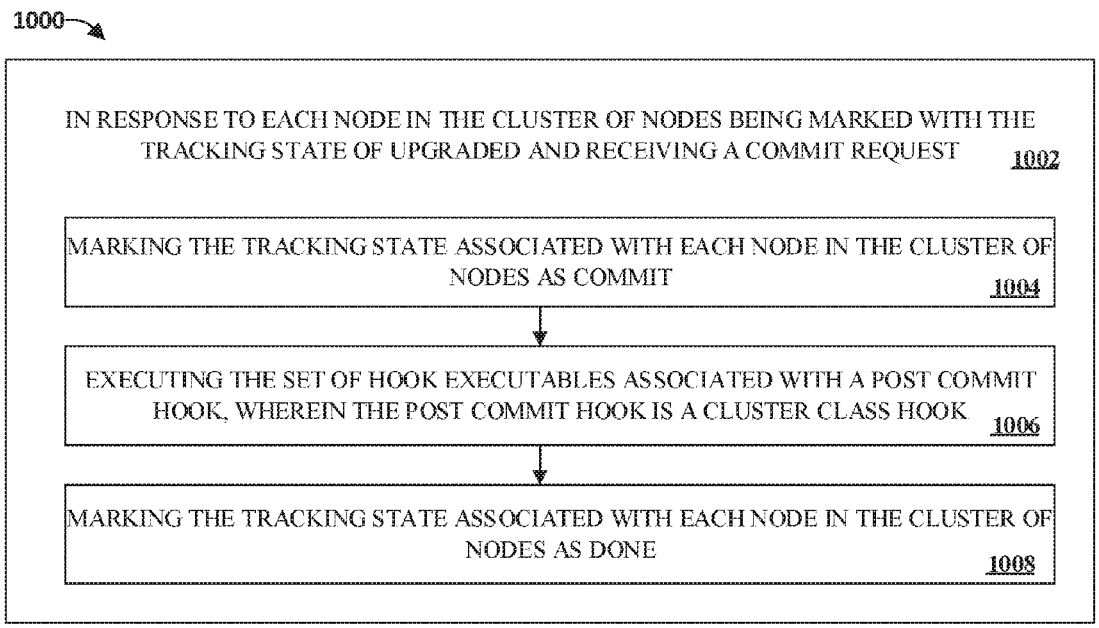
FIG. 10 illustrates an example method for responding to a commit request in accordance with implementations of this disclosure.

FIG. 10 illustrates an example method for responding to a commit request in accordance with implementations of this disclosure. Prior to starting the commit process, every node in the cluster of nodes should either be at an upgraded tracking state that indicates all nodes have been upgraded or a rolledback tracking state that all nodes have been downgraded back to their original version. At 1002, in response to receiving a commit request, steps 1004-1008 can proceed as provided below. At 1004, the tracking state associated with each node in the cluster of nodes can be marked as commit. At 1006, the set of hook executable associated with a post commit hook can be executed, wherein the post commit hook is a cluster class hook. At 1008, the tracking state associated with each node in the cluster of nodes can be marked as done.

Figure 11:
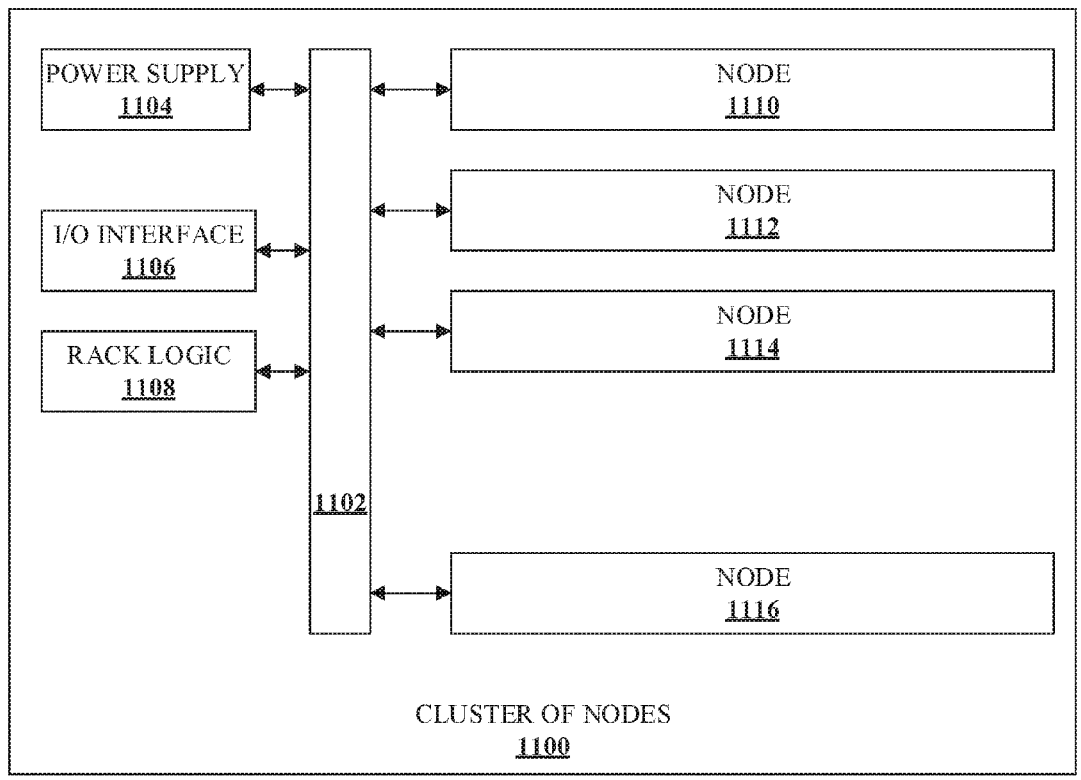
FIG. 11 illustrates an example block diagram of rack of a cluster of nodes in accordance with implementations of this disclosure.

FIG. 11 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 1110, 1112, 1114 and 1116 operating in a cluster; however, it can be appreciated that more or less nodes can make up a cluster. It can be further appreciated that nodes among the cluster of nodes do not have to be in a same enclosure as shown for ease of explanation in FIG. 11, and can be geographically disparate. Backplane 1102 can be any type of commercially available networking infrastructure that allows nodes among the cluster of nodes to communicate amongst each other in as close to real time as the networking infrastructure allows. It can be appreciated that the backplane 1102 can also have a separate power supply, logic, I/O, etc. as necessary to support communication amongst nodes of the cluster of nodes.

As shown in the figure, enclosure 1100 contains at least a power supply 1104, an input/output interface 1106, rack logic 1108, several blade servers 1110, 1112, 1114, and 1116, and backplane 1102. Power supply 1104 provides power to each component and blade server within the enclosure. The input/output interface 1106 provides internal and external communication for components and blade servers within the enclosure. Backplane 1108 can enable passive and active communication of power, logic, input signals, and output signals for each blade server.

It can be appreciated that the Cluster of nodes 1100 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 46 disk drive bays with attached disk storage in each bay. It can be appreciated that nodes within the cluster of nodes can have varying configurations and need not be uniform.

Figure 12:
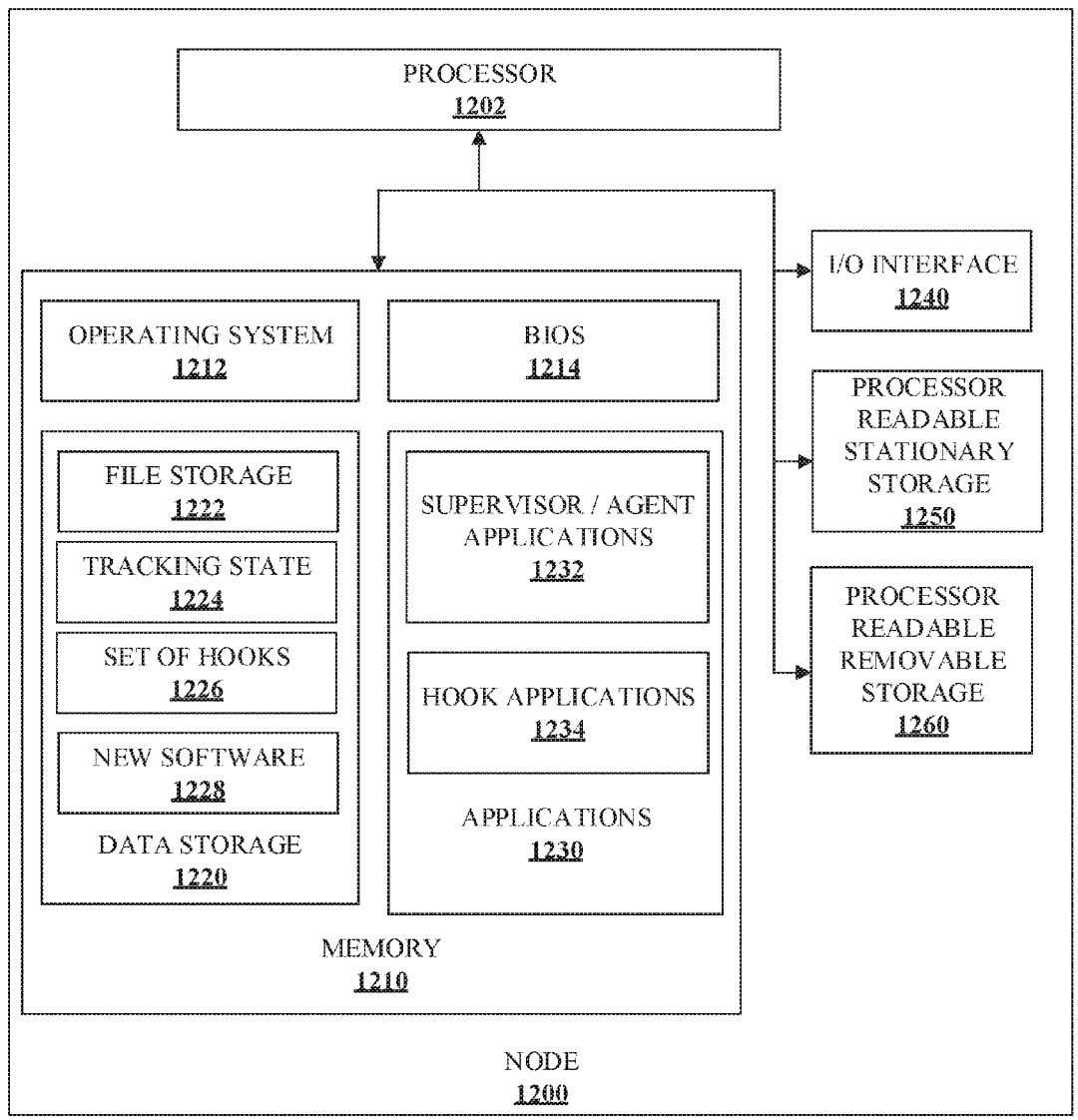
FIG. 12 illustrates an example block diagram of a node in accordance with implementations of this disclosure.

FIG. 12 illustrates an example block diagram of a blade server 1200 in accordance with implementations of this disclosure. As shown in FIG. 12, a plurality of blade servers may be included in one enclosure that shares resources provided by the enclosure to reduce size, power, and cost.

Node 1200 includes processor 1202 which communicates with memory 1210 via a bus. Node 1200 also includes input/output interface 1240, processor-readable stationary storage device(s) 1250, and processor-readable removable storage device(s) 1260. Input/output interface 1240 can enable node 1200 to communicate with other nodes, mobile devices, network devices, and the like. Processor-readable stationary storage device 1250 may include one or more devices such as an electromagnetic storage device (hard disk), solid state hard disk (SSD), hybrid of both an SSD and a hard disk, and the like. In some configurations, a node may include many storage devices. Also, processor-readable removable storage device 1260 enables processor 1202 to read non-transitive storage media for storing and accessing processor-readable instructions, modules, data structures, and other forms of data. The non-transitive storage media may include Flash drives, tape media, floppy media, disc media, and the like.

Memory 1210 may include Random Access Memory (RAM), Read-Only Memory (ROM), hybrid of RAM and ROM, and the like. As shown, memory 1210 includes operating system 1212 and basic input/output system (BIOS) 1214 for enabling the operation of blade server 1200. In various embodiments, a general-purpose operating system may be employed such as a version of UNIX, LINUX™, FreeBSD, OneFS, a specialized server operating system such as Microsoft's Windows Server™ and Apple Computer's OS X, or the like.

Applications 1230 may include processor executable instructions which, when executed by node 1200, transmit, receive, and/or otherwise process messages, audio, video, and enable communication with other networked computing devices. Examples of application programs include database servers, file servers, calendars, transcoders, and so forth. Applications 1230 may include, for example, supervisor and agent applications 1232 and event hook applications 1234 according to implementations of this disclosure. It can be appreciated that a UI for such application can exists, such as within a web UI for the distributed file system as a whole.

Human interface components (not pictured), may be remotely associated with blade server 1200, which can enable remote input to and/or output from blade server 1200. For example, information to a display or from a keyboard can be routed through the input/output interface 1240 to appropriate peripheral human interface components that are remotely located. Examples of peripheral human interface components include, but are not limited to, an audio interface, a display, keypad, pointing device, touch interface, and the like.

Data storage 1220 may reside within memory 1210 as well, storing file storage 1222 data such as metadata or LIN data. It can be appreciated that LIN data and/or metadata can relate to file storage within processor readable stationary storage 1250 and/or processor readable removable storage 1260. For example, LIN data may be cached in cache memory 1224 for faster or more efficient frequent access versus being stored within processor readable stationary storage 1250. In addition, Data storage 1220 can also store the tracking state 1224 of a node for reference by the supervisor and/or agent applications 132. Sets of hooks 1226 can be stored within data storage. New software 1228 such as the image for the new version of the distributed file system as well as old version of the distributed file system that supports a node being rolledback.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    initiating a supervisor on at least one node among a cluster of nodes, wherein the cluster of nodes operate to provide a distributed file system;
    initiating an agent on each node in the cluster of nodes, wherein the agent is responsive to commands issued by the supervisor;
    establishing a set of hooks, wherein hooks in the set of hooks are node class hooks or cluster class hooks;
    executing a set of hook executables associated with a pre upgrade hook, wherein the pre upgrade hook is a cluster class hook;
    iteratively instructing the agent for each node in the cluster of nodes to complete a sequential upgrade process, where the sequential upgrade process includes:
        marking a tracking state associated with the node as upgrading;
        installing new operating system software on the node;
        executing the set of hook executables associated with a pending reboot hook, wherein the pending reboot hook is a node class hook;
        executing the set of hook executables associated with a data migration upgrade hook, wherein the data migration upgrade hook is a node class hook;
        rebooting the node;
        executing the set of hook executables associated with a upgrade post reboot initial hook, wherein the upgrade post reboot initial hook is a node class hook;
        executing the set of hook executables associated with a upgrade post reboot final hook, wherein the upgrade post reboot final hook is a node class hook; and
        marking the tracking state associated with the node as upgraded; and
    in response to each node in the cluster of nodes being marked with the tracking state of upgraded, executing the set of hook executables associated with a last node post upgrade hook, wherein the last node post upgrade hook is a cluster class hook.

2. The method of claim 1, further comprising:
    in response to receiving a rollback request:
        completing the sequential upgrade process for a node with the tracking state as upgrading; and
        instructing the supervisor to terminate any pending iterations of nodes in the cluster of nodes to complete the sequential upgrade process.

3. The method of claim 2, further comprising:
    executing the set of hook executables associated with a pre rollback hook, wherein the pre rollback hook is a cluster class hook;
    iteratively instructing the agent for each node in the cluster of nodes to complete a sequential rollback process, where the sequential rollback process includes:
        marking a tracking state associated with the node as rollback;
        installing new operating system software on the node;
        executing the set of hook executables associated with a pending reboot hook, wherein the pending reboot hook is a node class hook;
        executing the set of hook executable associated with a data migration rollback hook, wherein the data migration rollback hook is a node class hook;
        rebooting the node;
        executing the set of hook executables associated with a upgrade post reboot initial hook, wherein the upgrade post reboot initial hook is a node class hook;
        executing the set of hook executables associated with a upgrade post reboot final hook, wherein the upgrade post reboot final hook is a node class hook; and
        marking the tracking state associated with node as rolledback; and
    in response to each node in the cluster of nodes being marked with the tracking state of rolledback, executing the set of hook executables associated with a post rollback hook, wherein the post rollback hook is a cluster class hook.

4. The method of claim 1, further comprising:
in response to each node in the cluster of nodes being marked with the tracking state of upgraded and receiving a commit request:
marking the tracking state associated with each node in the cluster of nodes as commit;
executing the set of hook executables associated with a post commit hook, wherein the post commit hook is a cluster class hook; and
marking the tracking state associated with each node in the cluster of nodes as done.

5. The method of claim 1, wherein the cluster class hooks are executed on all nodes of the cluster of nodes simultaneously.

6. The method of claim 1, wherein the node class hooks are executed on one node among the cluster of nodes.

7. A system comprising at least one storage device and at least one hardware processor configured to:
initiate a supervisor on at least one node among a cluster of nodes, wherein the cluster of nodes operate to provide a distributed file system;
initiate an agent on each node in the cluster of nodes, wherein the agent is responsive to commands issued by the supervisor;
establish a set of hooks, wherein hooks in the set of hooks are node class hooks or cluster class hooks;
execute a set of hook executables associated with a pre upgrade hook, wherein the pre upgrade hook is a cluster class hook;
iteratively instruct the agent for each node in the cluster of nodes to complete a sequential upgrade process, where the sequential upgrade process includes:
mark a tracking state associated with the node as upgrading;
install new operating system software on the node;
execute the set of hook executables associated with a pending reboot hook, wherein the pending reboot hook is a node class hook;
execute the set of hook executables associated with a data migration upgrade hook, wherein the data migration upgrade hook is a node class hook;
reboot the node;
execute the set of hook executables associated with a upgrade post reboot initial hook, wherein the upgrade post reboot initial hook is a node class hook;
execute the set of hook executables associated with a upgrade post reboot final hook, wherein the upgrade post reboot final hook is a node class hook; and
mark the tracking state associated with the node as upgraded; and
in response to each node in the cluster of nodes being marked with the tracking state of upgraded, execute the set of hook executables associated with a last node post upgrade hook, wherein the last node post upgrade hook is a cluster class hook.

8. The system of claim 7, wherein the at least one hardware processor is further configured to:
in response to receiving a rollback request:
complete the sequential upgrade process for a node with the tracking state as upgrading; and
instruct the supervisor to terminate any pending iterations of nodes in the cluster of nodes to complete the sequential upgrade process.

9. The system of claim 8, wherein the at least one hardware processor is further configured to:

execute the set of hook executables associated with a pre rollback hook, wherein the pre rollback hook is a cluster class hook;
iteratively instruct the agent for each node in the cluster of nodes to complete a sequential rollback process, where the sequential rollback process includes:
mark a tracking state associated with the node as rollback;
install new operating system software on the node;
execute the set of hook executables associated with a pending reboot hook, wherein the pending reboot hook is a node class hook;
execute the set of hook executable associated with a data migration rollback hook, wherein the data migration rollback hook is a node class hook;
reboot the node;
execute the set of hook executables associated with a upgrade post reboot initial hook, wherein the upgrade post reboot initial hook is a node class hook;
execute the set of hook executables associated with a upgrade post reboot final hook, wherein the upgrade post reboot final hook is a node class hook; and
mark the tracking state associated with node as rolledback; and
in response to each node in the cluster of nodes being marked with the tracking state of rolledback, execute the set of hook executables associated with a post rollback hook, wherein the post rollback hook is a cluster class hook.

10. The system of claim 7, wherein the at least one hardware processor is further configured to:
in response to each node in the cluster of nodes being marked with the tracking state of upgraded and receiving a commit request:
mark the tracking state associated with each node in the cluster of nodes as commit;
execute the set of hook executables associated with a post commit hook, wherein the post commit hook is a cluster class hook; and
mark the tracking state associated with each node in the cluster of nodes as done.

11. The system of claim 7, wherein the cluster class hooks are executed on all nodes of the cluster of nodes simultaneously.

12. The system of claim 7, wherein the node class hooks are executed on one node among the cluster of nodes.

13. A non-transitory computer readable medium with program instructions stored thereon to perform the following steps:
initiating a supervisor on at least one node among a cluster of nodes, wherein the cluster of nodes operate to provide a distributed file system;
initiating an agent on each node in the cluster of nodes, wherein the agent is responsive to commands issued by the supervisor;
establishing a set of hooks, wherein hooks in the set of hooks are node class hooks or cluster class hooks;
executing a set of hook executables associated with a pre upgrade hook, wherein the pre upgrade hook is a cluster class hook;
iteratively instructing the agent for each node in the cluster of nodes to complete a sequential upgrade process, where the sequential upgrade process includes:
marking a tracking state associated with the node as upgrading;
installing new operating system software on the node;

executing the set of hook executables associated with a pending reboot hook, wherein the pending reboot hook is a node class hook;

executing the set of hook executables associated with a data migration upgrade hook, wherein the data migration upgrade hook is a node class hook;

rebooting the node;

executing the set of hook executables associated with a upgrade post reboot initial hook, wherein the upgrade post reboot initial hook is a node class hook;

executing the set of hook executables associated with a upgrade post reboot final hook, wherein the upgrade post reboot final hook is a node class hook; and marking the tracking state associated with the node as upgraded; and in response to each node in the cluster of nodes being marked with the tracking state of upgraded, executing the set of hook executables associated with a last node post upgrade hook, wherein the last node post upgrade hook is a cluster class hook.

14. The non-transitory computer readable medium of claim 13, with program instructions stored thereon to further perform the following steps:

in response to receiving a rollback request:
completing the sequential upgrade process for a node with the tracking state as upgrading; and
instructing the supervisor to terminate any pending iterations of nodes in the cluster of nodes to complete the sequential upgrade process.

15. The non-transitory computer readable medium of claim 14, with program instructions stored thereon to further perform the following steps:

executing the set of hook executables associated with a pre rollback hook, wherein the pre rollback hook is a cluster class hook;

iteratively instructing the agent for each node in the cluster of nodes to complete a sequential rollback process, where the sequential rollback process includes:

marking a tracking state associated with the node as rollback;

installing new operating system software on the node;

executing the set of hook executables associated with a pending reboot hook, wherein the pending reboot hook is a node class hook;

executing the set of hook executable associated with a data migration rollback hook, wherein the data migration rollback hook is a node class hook;

rebooting the node;

executing the set of hook executables associated with a upgrade post reboot initial hook, wherein the upgrade post reboot initial hook is a node class hook;

executing the set of hook executables associated with a upgrade post reboot final hook, wherein the upgrade post reboot final hook is a node class hook; and marking the tracking state associated with node as rolledback; and in response to each node in the cluster of nodes being marked with the tracking state of rolledback, executing the set of hook executables associated with a post rollback hook, wherein the post rollback hook is a cluster class hook.

16. The non-transitory computer readable medium of claim 13, with program instructions stored thereon to further perform the following steps:

in response to each node in the cluster of nodes being marked with the tracking state of upgraded and receiving a commit request:

marking the tracking state associated with each node in the cluster of nodes as commit;

executing the set of hook executables associated with a post commit hook, wherein the post commit hook is a cluster class hook; and marking the tracking state associated with each node in the cluster of nodes as done.

17. The non-transitory computer readable medium of claim 13, wherein the cluster class hooks are executed on all nodes of the cluster of nodes simultaneously.

18. The non-transitory computer readable medium of claim 13, wherein the node class hooks are executed on one node among the cluster of nodes.

* * * * *